United States Patent
Forouzan et al.

(10) Patent No.: US 10,481,623 B1
(45) Date of Patent: Nov. 19, 2019

(54) OPTIMIZING A TEMPERATURE PROFILE IN A THERMAL MANAGEMENT SYSTEM OF AN ELECTRIC VEHICLE

(71) Applicants: Chongqing Jinkang New Energy Automobile Co., Ltd., Chongqing (CN); SF Motors Inc., Santa Clara, CA (US)

(72) Inventors: Mehdi Forouzan, Santa Clara, CA (US); Saeed Khaleghi Rahimian, Santa Clara, CA (US); Sangwoo Han, Santa Clara, CA (US); Ying Liu, Santa Clara, CA (US); Yifan Tang, Santa Clara, CA (US)

(73) Assignees: CHONGQING JINKANG NEW ENERGY AUTOMOBILE CO., LTD., Chongqing (CN); SF MOTORS INC., Santa Clara, CA (US)

( * ) Notice: Subject to any disclaimer, the term of this patent is extended or adjusted under 35 U.S.C. 154(b) by 0 days.

(21) Appl. No.: 16/222,883

(22) Filed: Dec. 17, 2018

(51) Int. Cl.
*G05D 23/19* (2006.01)
*H01M 10/44* (2006.01)
*G05B 13/04* (2006.01)
*H01M 10/0525* (2010.01)

(52) U.S. Cl.
CPC ....... *G05D 23/1917* (2013.01); *G05B 13/048* (2013.01); *H01M 10/0525* (2013.01); *H01M 10/441* (2013.01); *H01M 2220/20* (2013.01)

(58) Field of Classification Search
CPC .......... G05D 23/1917; H01M 10/0525; H01M 10/441; H01M 2220/20; G05B 13/048
USPC ....................................................... 700/300
See application file for complete search history.

(56) References Cited

U.S. PATENT DOCUMENTS

| | | | |
|---|---|---|---|
| 10,071,648 B1* | 9/2018 | K | B60L 11/1861 |
| 2005/0089750 A1* | 4/2005 | Ng | H01M 2/0242 |
| | | | 429/120 |
| 2011/0117463 A1* | 5/2011 | Lienkamp | H01M 10/0525 |
| | | | 429/433 |

(Continued)

OTHER PUBLICATIONS

M. Gepp, R. Filimon, S. Koffel, V. R. H. Lorentz and M. März, "Advanced thermal management for temperature homogenization in high-power lithium-ion battery systems based on prismatic cells," pp. 1230-1235, Ieeexplore.ieee.org, IEEE, Oct. 1, 2015, retrieved on Jul. 7, 2019. (Year: 2015).*

(Continued)

*Primary Examiner* — Christopher E. Everett
*Assistant Examiner* — Mohammed Shafayet
(74) *Attorney, Agent, or Firm* — Kilpatrick Townsend & Stockton LLP

(57) ABSTRACT

A method for controlling battery temperature during a charge cycle includes representing a battery cell as a plurality of individual battery cells such that each representation of the individual battery cells can be simulated individually; for each of the individual battery cells, calculating one or more simulated responses during a charge cycle based at least in part on one or more values indicative of a charge rate; determining an optimal input temperature profile for the charge rate that minimizes differences between simulated responses for each of the plurality of individual battery cells; and providing the optimal input temperature profile for control of a temperature management system that monitors and controls a temperature of the battery cell.

20 Claims, 11 Drawing Sheets

(56) References Cited

U.S. PATENT DOCUMENTS

| | | | | |
|---|---|---|---|---|
| 2011/0301931 A1* | 12/2011 | Gering | G01R 31/392 | 703/13 |
| 2012/0263986 A1* | 10/2012 | Fulop | H01M 2/30 | 429/91 |
| 2013/0221907 A1* | 8/2013 | Suzuki | H01M 10/443 | 320/107 |
| 2013/0234648 A1* | 9/2013 | Kelty | B60L 1/02 | 320/106 |
| 2013/0307475 A1* | 11/2013 | Kishiyama | H02J 7/0027 | 320/109 |
| 2014/0062415 A1* | 3/2014 | Barsukov | H02J 7/00 | 320/134 |
| 2014/0193683 A1* | 7/2014 | Mardall | H01M 2/1077 | 429/99 |
| 2015/0069975 A1* | 3/2015 | Farah | H02J 7/0019 | 320/150 |
| 2015/0180090 A1* | 6/2015 | Duan | H01M 10/425 | 429/50 |
| 2016/0089994 A1* | 3/2016 | Keller | H02J 7/045 | 320/153 |
| 2016/0144737 A1* | 5/2016 | Liu | B60L 11/182 | 320/149 |
| 2016/0336765 A1* | 11/2016 | Trimboli | H02J 7/0021 | |
| 2017/0190262 A1* | 7/2017 | Jin | B60L 58/12 | |
| 2017/0203654 A1* | 7/2017 | He | B60W 10/06 | |
| 2017/0203660 A1* | 7/2017 | He | B60L 11/1816 | |
| 2017/0203667 A1* | 7/2017 | He | B60L 11/1864 | |
| 2017/0259687 A1* | 9/2017 | Chikkannanavar | B60L 11/1861 | |
| 2018/0196107 A1* | 7/2018 | Fleischer | G01R 31/025 | |
| 2018/0316195 A1* | 11/2018 | Verbrugge | H02J 7/007 | |

OTHER PUBLICATIONS

N. Javani, I. Dincer, G.F. Naterer, G.L. Rohrauer, "Modeling of passive thermal management for electric vehicle battery packs with PCM between cells," Applied Thermal Engineering, vol. 73, Issue 1, pp. 307-316, sciencedirect.com Jul. 2014, retrieved on Jul. 7, 2019. (Year: 2014).*

\* cited by examiner

Electrolyte Material Balance $$\varepsilon_i \frac{\partial c_{e,i}}{\partial t} = \frac{\partial}{\partial x}\left(D_{eff}\frac{\partial c_{e,i}}{\partial x}\right) + J_i(a_i)(1-(t^+)) = 0$$

$$-D_{eff,N}\frac{\partial c_{e,N}}{\partial x}\bigg|_{x=0} = 0 \quad \text{and} \quad -D_{eff,P}\frac{\partial c_{e,P}}{\partial x}\bigg|_{x=L_N+L_S+L_P} = 0$$

- Porosity: $\varepsilon_i$
- Electrolyte Diffusivity: $D_{eff}$
- Transference Number: $(t^+)$
- Specific Interfacial Area: $a_i$

502

Solid Material Balance $$\frac{\partial c_{s,i}}{\partial t} = \frac{1}{r^2}\frac{\partial}{\partial r}\left(D^s_{eff,i} r^2 \frac{\partial c_{s,i}}{\partial r}\right)$$

$$-D_{s,i}\frac{\partial c_{s,i}}{\partial r}\bigg|_{r=0} = 0 \quad \text{and} \quad -D_{s,i}\frac{\partial c_{s,i}}{\partial r}\bigg|_{r=R} = J_i$$

- Solid Diffusivity: $D^s_{eff,i}$

Electrolyte Charge Balance $$-\frac{\partial}{\partial x}\left(k_{\text{eff},i}\frac{\partial \varphi_{e,i}}{\partial x}\right) + \frac{2RT}{F}(1-t^+)\left(1+\frac{\partial \ln f_{\pm,i}}{\partial \ln c_{e,i}}\right)\frac{\partial}{\partial x}\left(k_{\text{eff},i}\frac{\partial \ln c_{e,i}}{\partial x}\right) = j_i a_i F$$

$$-k_{\text{eff},i}\frac{\partial \varphi_{e,i}}{\partial x}\bigg|_{x=0,\,L_N+L_S+L_P} = 0$$

Ionic Conductivity → $k_{\text{eff},i}$

506

Solid Charge Balance $$\sigma_{\text{eff},i}\frac{\partial^2 \varphi_{s,i}}{\partial x^2} = j_i a_i F$$

$$\sigma_{\text{eff},i}\frac{\partial \varphi_{s,i}}{\partial x}\bigg|_{x=0,\,L_N+L_S+L_P} = -I_{\text{app}} \quad \text{and} \quad \sigma_{\text{eff},i}\frac{\partial \varphi_{s,i}}{\partial x}\bigg|_{x=L_N,\,L_N+L_S} = 0$$

Electronic Conductivity → $\sigma_{\text{eff},i}$

508

Electrolyte Charge Balance $$j_i = \left(2 k_{\text{eff},i}^{\text{rxn}}\right)\left(c_{s,i,\max} - c_{s,i,\text{surf}}\right)^\alpha c_{s,i,\text{surf}}^\alpha c_{e,i}^\alpha \sinh\left[\frac{\alpha F}{RT}\eta_i\right]$$

Reaction Rate Constant → $2 k_{\text{eff},i}^{\text{rxn}}$ $$\eta_i = \varphi_{s,i} - \varphi_{e,i} - U_i$$

Equilibrium Potential (OCV) → $U_i$

Solid Charge Balance

Specific Heat → $\rho_i C_{p,i}$

Thermal Conductivity → $\lambda_i$

Entropy Coefficient → $\left.\frac{\partial U_i}{\partial T}\right|_{T_{ref}}$ $$\rho_i C_{p,i} \frac{\partial T}{\partial t} = \lambda_i \frac{\partial^2 T}{\partial x^2} + Q_{rxn,i} + Q_{ohm,i} + Q_{rev,i}$$

$$Q_{rxn,i} = J_i a_i F \eta_i \quad \text{and} \quad Q_{rev,i} = J_i a_i F T \left.\frac{\partial U_i}{\partial T}\right|_{T_{ref}}$$

$$Q_{ohm,i} = \sigma_{eff,i} \left(\frac{\partial \varphi_{s,i}}{\partial x}\right)^2 + k_{eff,i} \left(\frac{\partial \varphi_{e,i}}{\partial x}\right)^2 + k_{eff,i} \frac{2RT}{F}(1 - t^+)\left(1 + \frac{\partial \ln f_{\pm}}{\partial \ln c_e}\right)\frac{\partial \ln c_{e,i}}{\partial x}\frac{\partial \varphi_{e,i}}{\partial x}$$

$$-\lambda_N \left.\frac{\partial T_N}{\partial x}\right|_{x=0} = h(T_\infty - T_N) \quad \text{and} \quad -\lambda_P \left.\frac{\partial T_P}{\partial x}\right|_{x=L_N+L_S+L_P} = h(T_P - T_\infty)$$

Heat Transfer Coefficient → $h$

OPTIMIZING A TEMPERATURE PROFILE IN A THERMAL MANAGEMENT SYSTEM OF AN ELECTRIC VEHICLE

BACKGROUND

Lithium-ion ("Li-ion") batteries are extensively used for energy storage applications. These applications include powering electric vehicles ("EVs") and personal electric devices, such as laptops computers, digital music players, smart phones, and so forth. Li-ion batteries are particularly advantageous in these application due to their high energy density, high operational voltage, and low self-discharge rate. However, despite their widespread use and growing popularity, serious technical challenges remain in the use of Li-ion cells. These challenges include range per charge, charging time, cost, safety, and most importantly, cell lifetime. These challenges are especially pronounced in EV applications where long-term cycling and lifetimes of 10-15 years are expected.

To increase the lifetime of a Li-ion cell, degradation and aging mechanisms must first be comprehensively understood. Growth of a solid electrolyte interface (SEI) over time and the phenomenon known as lithium plating are considered the most important degradation modes. SEI is a passivation layer that forms on the surface of the active particles due to unwanted lithium reactions. Lithium plating is a cathodic reaction where lithium ions are reduced from ionic lithium to metallic lithium on the surface of the active particles of the anode underneath the SEI layer. While part of the metallic lithium may be stripped away during rest and discharge, a portion referred to as "dead lithium" cannot be removed. This provokes safety issues, such as dendrite growth, in addition to a reduction of the overall cell capacity. These degradation modes also cause cell capacity fade and increase the internal resistance of the cell resulting in a shorter lifetime.

Lithium plating and SEI growth both result from parasitic and undesired reactions in the negative electrode. The rates of these reactions strongly depend on the cycling conditions and the design of the cell. These rates also tend to increase when increasing the charging rate of the cell. SEI growth and lithium plating have been extensively studied and researchers have mainly suggested electrolyte additives to reduce the rates of the unwanted reactions. However, a higher charging rate is expected and necessary for next generation Li-ion battery applications in the state-of-the-art EV technology. Therefore, a more robust solution is required in the art.

BRIEF SUMMARY

In some embodiments, a method for controlling battery temperature during a charge cycle may include representing a battery cell as a plurality of individual battery cells such that each representation of the individual battery cells can be simulated individually; for each of the individual battery cells, calculating one or more simulated responses during a charge cycle based at least in part on one or more values indicative of a charge rate; determining an optimal input temperature profile for the charge rate that minimizes an amount of lithium plating that occurs during the charge cycle; and providing the optimal input temperature profile for control of a temperature management system that monitors and controls a temperature of the battery cell.

In some embodiments, a non-transitory computer-readable medium comprising instructions that, when executed by one or more processors, cause the one or more processors to perform operations including representing a battery cell as a plurality of individual battery cells such that each representation of the individual battery cells can be simulated individually; for each of the individual battery cells, calculating one or more simulated responses during a charge cycle based at least in part on one or more values indicative of a charge rate; determining an optimal input temperature profile for the charge rate that minimizes differences between simulated responses for each of the plurality of individual battery cells; and providing the optimal input temperature profile for control of a temperature management system that monitors and controls a temperature of the battery cell.

In any embodiments, any of the following features may be included in any combination and without limitation. The battery cell may be one of a plurality of lithium-ion battery cells in a battery pack of an electric vehicle. The plurality of individual battery cells may include at least three individual battery cells. The battery cell may be divided into individual battery cells in a direction moving away from a heat/cold source. The battery cell may be divided into individual battery cells from a bottom to a top of the battery cell. A heat source may be disposed adjacent to the bottom of the battery cell. The one or more simulated responses may include a calculation of an amount of lithium plating that is deposited during the charge cycle. The one or more simulated responses may include current densities in the plurality of individual battery cells during the charge cycle. The one or more simulated responses may include temperature changes in the plurality of individual battery cells during the charge cycle. Calculating the one or more simulated responses may include using a model based on mass conservation in the battery cell. Calculating the one or more simulated responses may include using a model based on charge conservation in the battery cell. The one or more values indicative of a charge rate may include an input current. Calculating the one or more simulated responses during the charge cycle may be further based at least in part on an input temperature profile. The method/operations may further include providing a plurality of input temperature profiles when calculating the one or more simulated responses. The optimal input temperature profile may be selected from the plurality of input temperature profiles. The optimal input temperature profile may be further determined by minimizing an amount of lithium plating that occurs during the charge cycle. The optimal input temperature profile may be determined by identifying an input temperature profile that keeps a temperature of the battery cell below a maximum threshold. The temperature management system may control a heat source placed adjacent to the battery cell. The operations may further include controlling the temperature of the battery cell.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

FIGS. 5A-5C illustrate the specific equations that can be used to simulate the electrochemical responses of the representations of the different battery portions, according to some embodiments.

DETAILED DESCRIPTION

Figure 1:
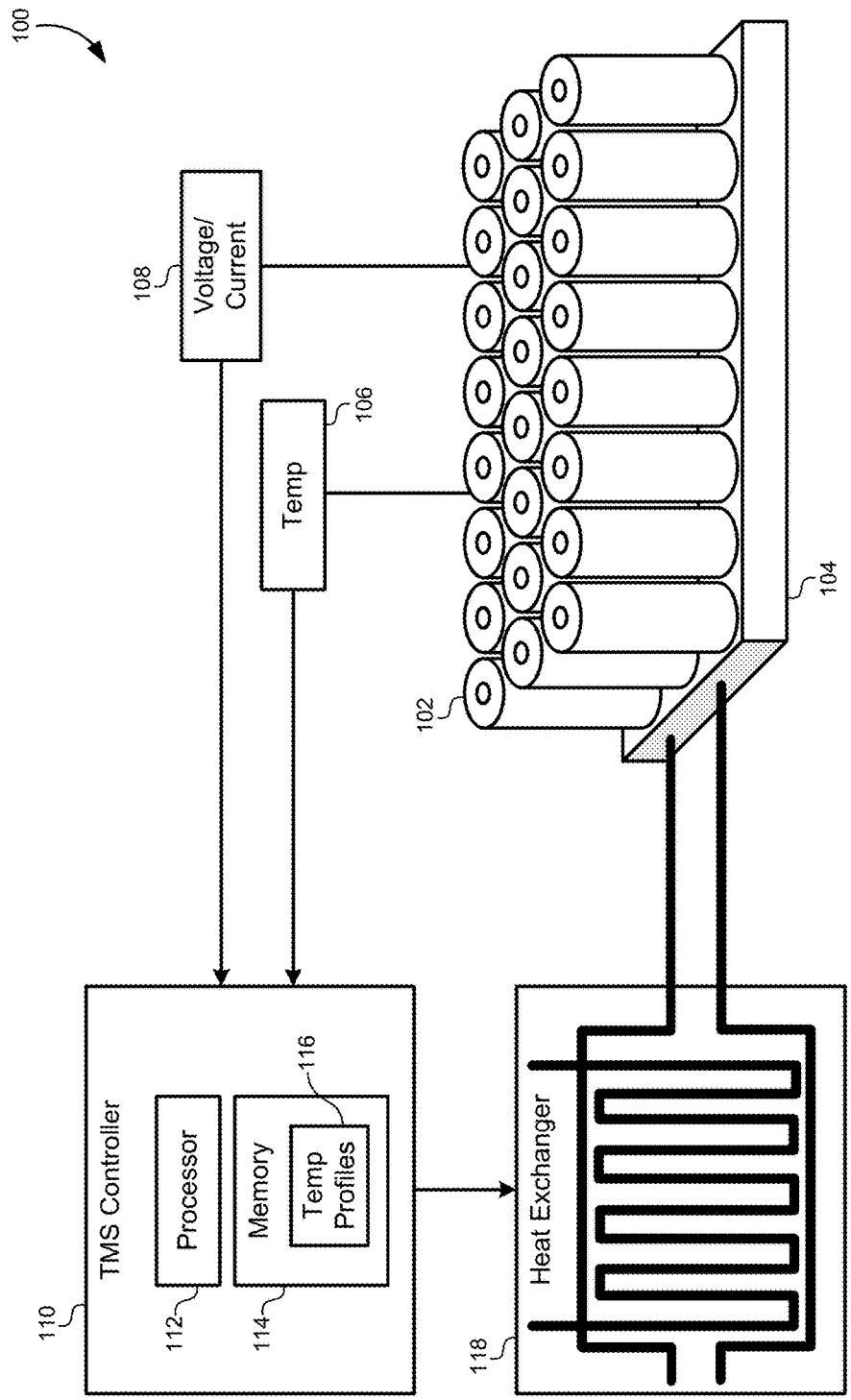
FIG. 1 illustrates a simplified block diagram of a TMS that may be used in electric vehicle, according to some embodiments.

Described herein, are embodiments for modeling, simulating, and determining an optimal input temperature profile for a temperature management system (TMS) in an electric vehicle. The TMS may use cooling/heating channels that are adjacent to at least one side of one or more battery cells. This may cause the cooling/heating channels to nonuniformly cool/heat each battery cell. Therefore, instead of modeling the response of the battery cell as a single entity, the embodiments described herein may subdivide a representation of the battery cell into a plurality of sections that can each be individually simulated individually. Equations used to model the output response characteristics of each of the sections of the battery cell can accept a value indicative of a charge rate and/or an input temperature profile and generate resulting output responses. These outputs may include current densities, temperatures, lithium plating amounts, and so forth. These responses can then be analyzed to determine an optimal input temperature profile. The optimal input temperature profile may be determined based on responses that minimize differences between the different sections of the battery itself. Additionally, the optimal input temperature profile may also be determined based on responses that minimize an overall amount of lithium plating that takes place during the charge cycle. The optimal input temperature profile can then be provided to the TMS for controlling the temperature of the battery cell during actual charge cycles.

Lithium ion battery cells are seeing widespread use in commercial, residential, and automotive applications. However, one of the barriers that prevents lithium-ion batteries from replacing traditional energy technologies is battery charging. For example, the automotive industry is still primarily powered by the traditional gasoline combustion engine. One of the distinct advantages of the combustion engine is how rapidly it can be refueled. For example, a stop at a gas station typically takes less than 5 minutes and can produce hundreds of miles of energy for a vehicle powered by a combustion engine. In contrast, electric vehicles powered by lithium-ion batteries can require more than 30 minutes to recharge the car's battery cells. It is this difference in the rate of refueling versus the rate of recharging that deters many individuals who would otherwise be likely to use an electric vehicle.

In order to make electric vehicles more palatable to the general public, battery charging cycles for electric vehicles should be made as short as possible. Therefore, the ability to rapidly charge lithium-ion batteries is of great importance to the industry. If the batteries in an electric vehicle can be recharged to an 80% state of charge (SOC) in under 30 minutes, electric vehicles may be much more competitive with traditional combustion engines. Therefore, the ability to rapidly charge lithium-ion batteries can provide technological improvements that affect energy efficiency, energy independence, environmental concerns, cost-effectiveness, and provide many other economic and societal benefits.

However, the solution is not as simple as simply applying more current to lithium-ion batteries to produce a faster charge. Specifically, fast charging lithium-ion batteries can degrade the batteries in a way that reduces the charge they can hold and reduces the lifetime of the batteries. When the instantaneous current of a charge cycle is increased, this generates a corresponding over-potential condition in the battery. The higher voltage applied between the anode and cathode is a primary driver of the reaction that causes a phenomenon referred to as "lithium plating" in the battery. At excessive currents, the lithium ions are deposited more rapidly as lithium plating than they are absorbed by the anode layers. This causes lithium ions to be deposited on the surface of the anode as metallic lithium rather than remaining as ionic lithium. This then causes a reduction in the free lithium ions that are available to charge the battery, generates "dead lithium," and results in irreversible capacity loss in the battery.

One way to control the formation of lithium plating during fast charging is to tightly control the temperature of the batteries. Excessive heat can damage the battery, while excessive cold can cause lithium plating. For example, fast charging a cold battery may reduce the reaction rate in the cathode of the battery by making it harder to insert lithium ions into the active particles. Lower temperatures may also increase the resistance of the battery material, which according to a Ohm's law consequently increases the over-potential while charging. As described above, over-potential is a strong driver of the lithium plating reaction. Conversely, high temperature batteries that are not efficiently cooled can generate more heat and possibly result in thermal runaway, which can also cause irreversible damage to the battery. Ideal charging conditions for a lithium battery typically range between 20° C. in 40° C. Typical operating conditions and electric vehicle can extend far beyond both ends of this temperature range.

To facilitate fast charging of battery cells while minimizing the damage done to the battery cells, the embodiments described herein generate optimized control data for operating a Thermal Management System (TMS). FIG. 1 illustrates a simplified block diagram of a TMS 100 that may be used in electric vehicle, according to some embodiments. The electric vehicle 100 may include a plurality of individual battery cells 102. For example, the plurality of battery cells 102 may include hundreds of lithium-ion cells that are packaged together in series/parallel combinations to provide electric power to an electric motor. The electric motor then converts the electric power provided by the plurality of battery cells 102 into rotational motion for the drivetrain of the vehicle.

The TMS 100 may include many electrical and mechanical components, only a portion of which are explicitly illustrated in FIG. 1. For example, the TMS 100 may include a plurality of sensors, such as the temperature sensor 106, and voltage/current sensors 108, and other sensors configured to monitor the state and environment of the batteries 102. Sensor readings may be processed by a TMS controller 110 that includes a processor 112, a memory 114, and other computer system components described in relation to FIG. 9. As described in greater detail below, the memory 114 may include one or more optimal input temperature profiles 116 that can be used to control the target temperature of the TMS 100 for the plurality of battery cells 102. To complete the control loop, the TMS 100 may include one or more devices that are configured to add or remove heat from the plurality of battery cells 102. The example illustrated in FIG. 1 includes a heat exchanger 118 and a heat transfer device 104.

The TMS 100 can use the control loop described above to perform a number of different thermal operations in relation to the plurality of battery cells 102. First, the TMS 100 can perform a cooling function that removes heat from the plurality of battery cells 102. For example, when the battery cells 102 reach their optimal temperature performance range, the TMS 100 can circulate liquid coolant through the heat transfer device 104 to remove heat from the batteries 102. Second, the TMS 100 can provide heat to the batteries 102 during cold temperatures. In relation to the embodiments described herein, when charging or fast charging batteries with temperatures below the optimal temperature range, the heat transfer device 104 can heat the batteries by circulating heated material (e.g., fluid, air, etc.) around the batteries 102. Some embodiments may also use electric heating to increase the temperature of the batteries. Some embodiments of the TMS 100 can also provide insulation around the batteries 102 to protect against extreme weather outside electric vehicle. The TMS 100 may also provide ventilation or air circulation in addition to the basic cooling/heating functions.

As illustrated in FIG. 1, the heat transfer device 104 typically only makes contact with a portion of each of the plurality of battery cells 102. For example, a cold plate placed beneath the batteries 102 may make contact with the bottom of the batteries 102, but might not make direct contact with the sides and/or top of the batteries 102. In another embodiment, the heat transfer device 104 may include coolant loops that are circulated between rows of the batteries 102, and thus the heat transfer device 104 may make contact with a portion of the sides of the batteries 102 while not directly contacting the top, bottom, or other portions of the sides of the batteries 102. Regardless of the type of heat transfer device 104 that is used, it is likely that the heat transfer device 104 does not even the contact each of the batteries 102. This results in uneven heating/cooling of each of the individual battery cells 102 during heating/cooling operations.

Recall from the discussion above that cold temperatures outside of an optimal range can lead to an increased likelihood of lithium plating during fast charging. These extreme operating temperatures are very common in electric vehicles. For example, because electric vehicles are stored and operated in outdoor weather conditions, is very likely that fast charging of the batteries may take place in conditions where the batteries are very cold. Although a typical heat transfer device 104 can efficiently heat/cool the plurality of battery cells 102 as a whole, they will typically unevenly heat/cool individual battery cells 102 during this process. In the example of FIG. 1 where the heat transfer device 104 contacts the bottom of the battery cells 102, each of the battery cells 102 will be heated/cooled from the bottom. Because cold temperature extremes can cause lithium plating, this may result in uneven lithium plating with in the battery cells. For example, lithium plating may be more extreme at the top of the battery cells 102 than at the bottom due to this uneven temperature regulation.

Therefore, the embodiments described herein are designed to (1) ensure that the temperature of the battery cells 102 is increased according to a temperature profile that minimizes lithium plating, and (2) minimize temperature variations inside individual battery cells 102 such that they are heated/cooled evenly during a fast charging scenario. Instead of changing the architecture of the TMS 100, some embodiments simulate different temperature profiles that heat/cool the batteries using an existing TMS 100. The simulation process can identify an optimal input temperature profile that can be applied to the TMS 100 such that the temperature rises/falls uniformly within each of the battery cells 102. Some embodiments may also use a real-time feedback loop that adjust parameters of the equations and/or models used to simulate the battery cells to adjust the optimal input temperature profile in real time as charging and/or operating conditions change.

Figure 2:
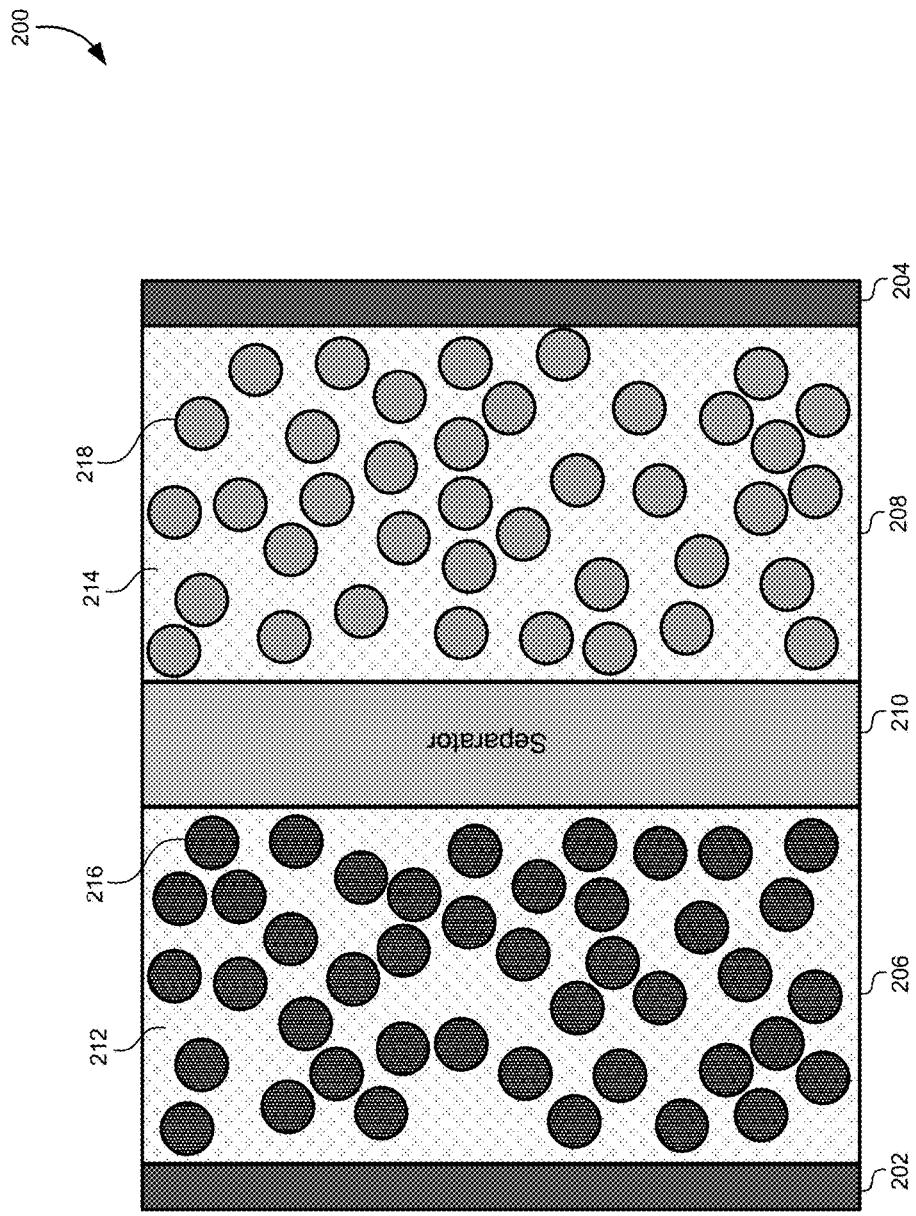
FIG. 2 illustrates a simplified diagram of a layer of a lithium battery used in electric vehicles, according to some embodiments.

The equations and models used to simulate the response of a lithium battery can be derived from a simplified physics model of a particular battery architecture used in electric vehicles. FIG. 2 illustrates a simplified diagram of a layer of a lithium battery 200 used in electric vehicles, according to some embodiments. A typical battery includes thin layers of material that are compressed together and rolled into a cylinder, or "jelly roll." The jelly roll may include anode and cathode leads that are connected to terminals of a battery housing that encases and protects the jelly roll. FIG. 2 illustrates each of these layers in detail. These layers only represent the physical layers in an actual lithium battery, they also represent a basic physics model using porous electrode and concentrated solution theories that accurately captures lithium ion migration inside the battery. This physics model is the basis of Newman's P2D model, which is discussed below and used to simulate the response of the battery to different temperature profiles.

A lithium battery may include a pair of current collectors 202, 204 that are connected to the anode and cathode leads respectively. The anode current collector 202 may comprise a sheet of copper, and the cathode current collector 204 may comprise a sheet of aluminum, although other materials may be used for either current collector 202, 204. The battery 200 includes a negative anode electrode 206 in a positive cathode electrode 208 that are isolated by a separator 210. Each electrode 206, 208 includes active particles 216, 218 and electrolyte solutions 212, 214. According to this physics model, the electrolyte phase may be continuous across the anode 206, separator 210, and cathode 208, with a solid particles phase that exists in the anode 206 and cathode 208. The solid active materials 216, 218 can be modeled as a matrix of mono-sized spherical particles as illustrated in FIG. 2.

During the discharge process, lithium may be diffused to the surface of the anode 206 and may undergo an electrochemical reaction. This reaction results in the release of an electron and transfers lithium to the electrolyte phase. The lithium ions may diffuse and conduct through the electrolyte 212, 214 from the anode 206 to the cathode 208 where a similar reaction transfers lithium to the positive solid phase. Lithium is then stored inside the active materials 218 of the cathode 208 as the battery 200 is discharged. Charging the battery 200 can be modeled using the opposite process described above. This lithium-ion transport process in the porous electrode and electrolyte solution can be described by charge and mass conservation laws. For example, charge conservation governs phase potentials, while mass conservation governs the phase concentrations of the electrolyte and solid phases in the chemistry of the battery 200. The embodiments described herein use this basic model in conjunction with Newman's below to model and simulate the response of the battery 200 during a fast charging scenario.

Figure 3:
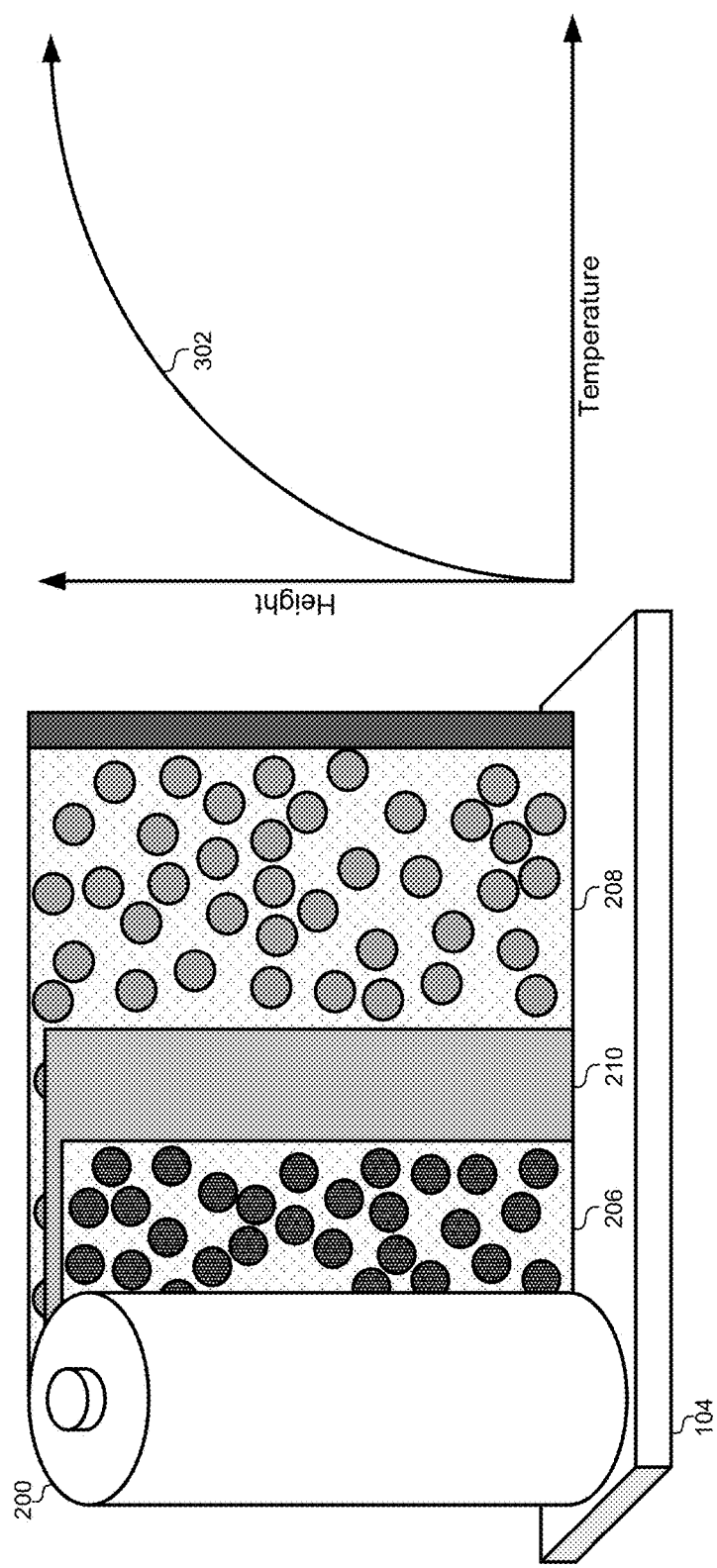
FIG. 3 illustrates a simplified diagram of how the various chemistry layers rolled up inside of a battery may be affected by uneven temperature, according to some embodiments.

FIG. 3 illustrates a simplified diagram of how the various chemistry layers rolled up inside of a battery 200 may be affected by uneven temperature, according to some embodiments. Each of the layers described in the model above can be placed in thin sheets on top of each other and rolled up into a cylinder inside of the housing of the battery 200. For example, the anode 206 may include a thin layer of graphite. The cathode 206 may use a layer of the lithium oxide family (e.g., lithium cobalt oxide, lithium manganese oxide, etc.). Each of these layers may be approximately uniform vertically within the battery 200. Therefore, under ideal conditions, current may flow back and forth between the anode 206 and the cathode 208 uniformly at the bottom of the battery 200 and the top of the battery 200, resulting in a uniform current density throughout.

However, as described above, the battery 200 may not make uniform contact with the heat transfer device 104 of the TMS 100. This causes heat to be unevenly applied/removed with respect to the battery 100. For example, when the battery 200 is heated by the heat transfer device 104, heat will gradually be transferred through the bottom of the battery 200 to the top of the battery. Because temperature affects the internal resistance of the battery, as well as other aspects of the electrochemical reaction, this uneven temperature within the battery 200 may cause uneven current densities between the bottom and top of the battery 200. This may also lead to varying over potentials within the battery 200, and consequently may result in uneven lithium plating within the battery 200.

Because the temperature, current, and potential within the battery 200 are not uniform, one cannot simply use existing equations/models to simulate the response of the battery 200 as a uniform anode/cathode reaction. For example, as illustrated in FIG. 3, the temperature 302 of the battery 200 will increase from bottom to top while heating the battery during a fast-charging scenario. Not only is this situation difficult to model using existing equations, it is even more difficult to accurately measure and observe in the real world. Temperature sensors, such as the temperature sensor 106 of the TMS 100 cannot be easily placed inside of each individual battery 200 in a plurality of batteries 102 in an electric vehicle 100. Such a system would be practically unworkable and would interfere with the operation of the batteries 102. Therefore, even existing models and equations were not able to accurately model the response of an individual battery 200 that may be subjected to uneven temperatures throughout.

Figure 4:
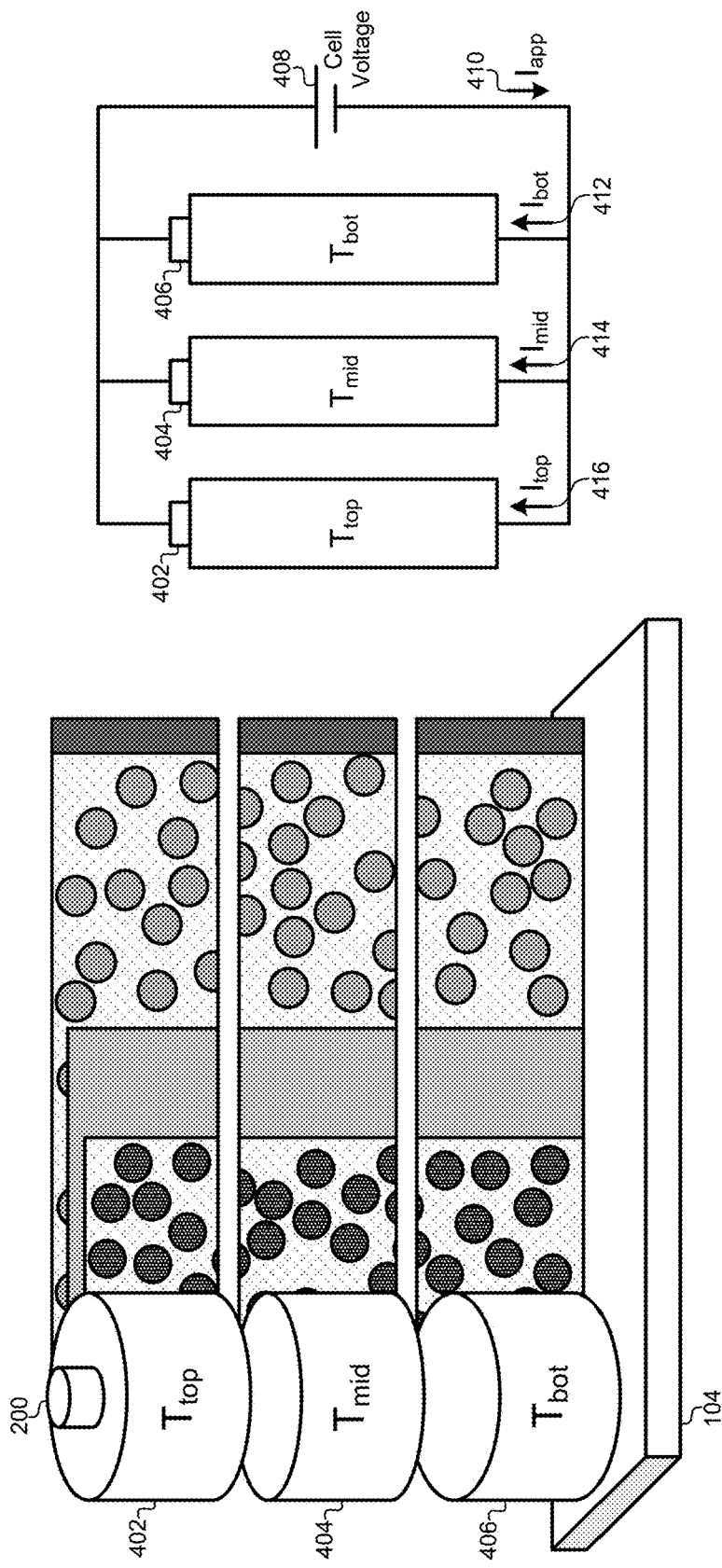
FIG. 4 illustrates how the physics model of the battery can be subdivided into a plurality of battery representations for simulation purposes, according to some embodiments.

The embodiments described herein solve this and other problems by accounting for this temperature difference during modeling and simulation. FIG. 4 illustrates how the physics model of the battery 200 can be subdivided into a plurality of battery representations for simulation purposes, according to some embodiments. In a general sense, it may be assumed that the battery 200 is exposed to a heat transfer device 104 along one edge or dimension of the battery. In this example, the heat transfer device 104 contacts the bottom of the battery 200. As described above, other embodiments of the heat transfer device 104 may include devices such as coolant loops that make contact or apply heat to a vertical side of the battery 200. In any scenario, the battery 200 may be divided into a plurality of parallel/series representations that can be simulated separately and combined using shared boundary conditions to analyze the different internal responses of portions of the battery due to temperature differences.

In the example of FIG. 4, because the heat transfer device 104 contacts the bottom of the battery 200, the battery 200 can be subdivided into a plurality of battery representations 402, 404, 406 in a vertical direction. Specifically, this example subdivides the battery 200 into a bottom battery 406, a middle battery 404, and a top battery 402. Each of these representations 402, 404, 406 are made using divisions that move away from the heat transfer device 404. In an architecture using a coolant loop that transfers heat through a side of the battery 200, the battery 200 could be subdivided vertically or radially into sections that move away from the side adjacent to the coolant loop. Therefore, the general principle of these embodiments is to subdivide the battery 200 into representations that can be modeled individually and combined to accurately simulate the different electrochemical responses in the different areas of the battery that are subject to different temperatures.

In this example, the battery 200 has been subdivided into three representations 402, 404, 406. This is provided merely by way of example and is not meant to be limiting. In general, the battery 200 can be subdivided into any number of representations, such as two, four, five, seven, ten, and so forth. However, each representation may be modeled as having a uniform internal temperature, so the number of representations may be selected based on a total temperature differential from one side to the other side of the battery. For example, in physical battery packages that result in large differentials from one side to the other, more representations may be used. For example the 18650 lithium battery pack is depicted in FIG. 4 can be simulated with good results using three representations.

Because of the layered topology of the jelly roll inside the battery 200, each of the representations 402, 404, 406 can be modeled as individual battery cells connected in parallel as depicted in FIG. 4. The voltage across each of these individual battery cells will be equal to the overall cell voltage 408 of the battery 200. Similarly, the current passing through each of these individual battery cells will add up to the total current 410 passing through the battery 200. This model allows for the different currents passing through each portion of the battery to be more accurately simulated. For example, when the battery 200 is being heated from the bottom up, the actual current 412 through the bottom representation 406 will be different from the actual current 414 running through the middle representation 404 and the actual current 416 running through the top representation 402. In the models for each of these representations 402, 404, 406, the boundary conditions allow each of the representations 402, 404, 406 to be modeled individually but combined into a single conceptual circuit as illustrated in FIG. 4.

FIGS. 5A-5C illustrate the specific equations that are part of the Newman P2D model that can be used to simulate the electrochemical responses of the representations of the different battery portions, according to some embodiments. This electrochemical model was developed in the COMSOL Multiphysics 5.4 software package. This is a finite-element based software suite that allows for the simulation of several partial differential equations representing charging diffusion material balances in both solid and electrolyte phases that are solved simultaneously. Additionally, to accurately predict the battery response, a lump thermal model has been considered, meaning that temperature changes are calculated only with respect to time and not with respect to position inside each representation. These equations allow for the modeling of several different over-potentials in the battery, such as solid diffusion in the cathode and anode, the reaction (i.e., charge transfer resistance) in the cathode and anode, and the ohmic and diffusion resistance in the cathode, separator, and anode electrolyte.

The lumped heat balance of the cell can be coupled with the equations in FIGS. 5A-5C to predict the lumped temperature of the battery cell. The electrochemical reactions may take place on the surface of the active particles represented as by the Butler-Volmer equation that would be known to one having skill in the art. Lithium plating may be considered an electrochemical reaction with an equilibrium potential of zero. When lithium plating starts (e.g., at a high state of charge during a charge cycle), there may be a competition between lithium plating and the intercalation currents evaluated by this model that can be changed with different model parameter sets.

Referring back briefly to FIG. 4, the three representations 402, 404, 406 of the different regions in the battery cell can each be simulated using these equations. To model the system, the three representations 402, 404, 406 may be considered electrically connected in parallel to each other to simulate the sharing of a current collector. According to Ohm's law, and knowing that the voltages across parallel-connected cells are equivalent, the regions with lower resistance will receive more current. One challenge in the simulation is that the resistance of the battery cell is highly nonlinear and thus needs to be evaluated continuously over time. To facilitate this simulation, a controller model may be employed that controls the three region current densities according to the individual region resistances. The region resistances (or voltages) may be computed by three parallel-connected electrochemical models. The result of this model can provide non-uniform temperature, current density, local state of charge (SOC) and lithium plating information. Each of these outputs of the model may affect the non-uniform degradation of the battery cell according to the Newman model and the equations described above.

It should be emphasized that this model is well-suited to predict the cycling behavior of lithium batteries in response to an input temperature profile for a TMS in many different conditions. The relationship between different operating conditions in the performance of the battery cell is important information when designing, developing, and optimizing the hardware designs. For example, the information provided by this modeling technique may be very beneficial for the TMS design in particular, and may result in improved performance and reduced lithium plating and battery degradation. This in turn may lead to longer lifetimes for batteries, faster charging cycles, and an overall greater acceptance of electric vehicles in society.

The information provided by this modeling technique is also not readily determined by any other means. Lithium plating is a very challenging problem to study experimentally. For example, it is not possible to monitor locations in the negative electrode where lithium ions tend to form lithium plates. Furthermore, it is extremely difficult to measure the actual amount of lithium plated under different charging conditions. However, by dividing the battery cell topology into a plurality of sub-regions, this method is able to accurately estimate an amount of plated lithium in different circumstances. No existing models studying lithium plating have focused on different areas within a single battery cell, nor have they used this information to optimize the performance of a TMS by determining an optimal input temperature profile. The optimized temperature profile of the TMS effectively mitigates a majority of the lithium plating that would normally take place and prevents non-uniform conditions from being perpetuated during a wide range of charging and use scenarios.

Figure 6:
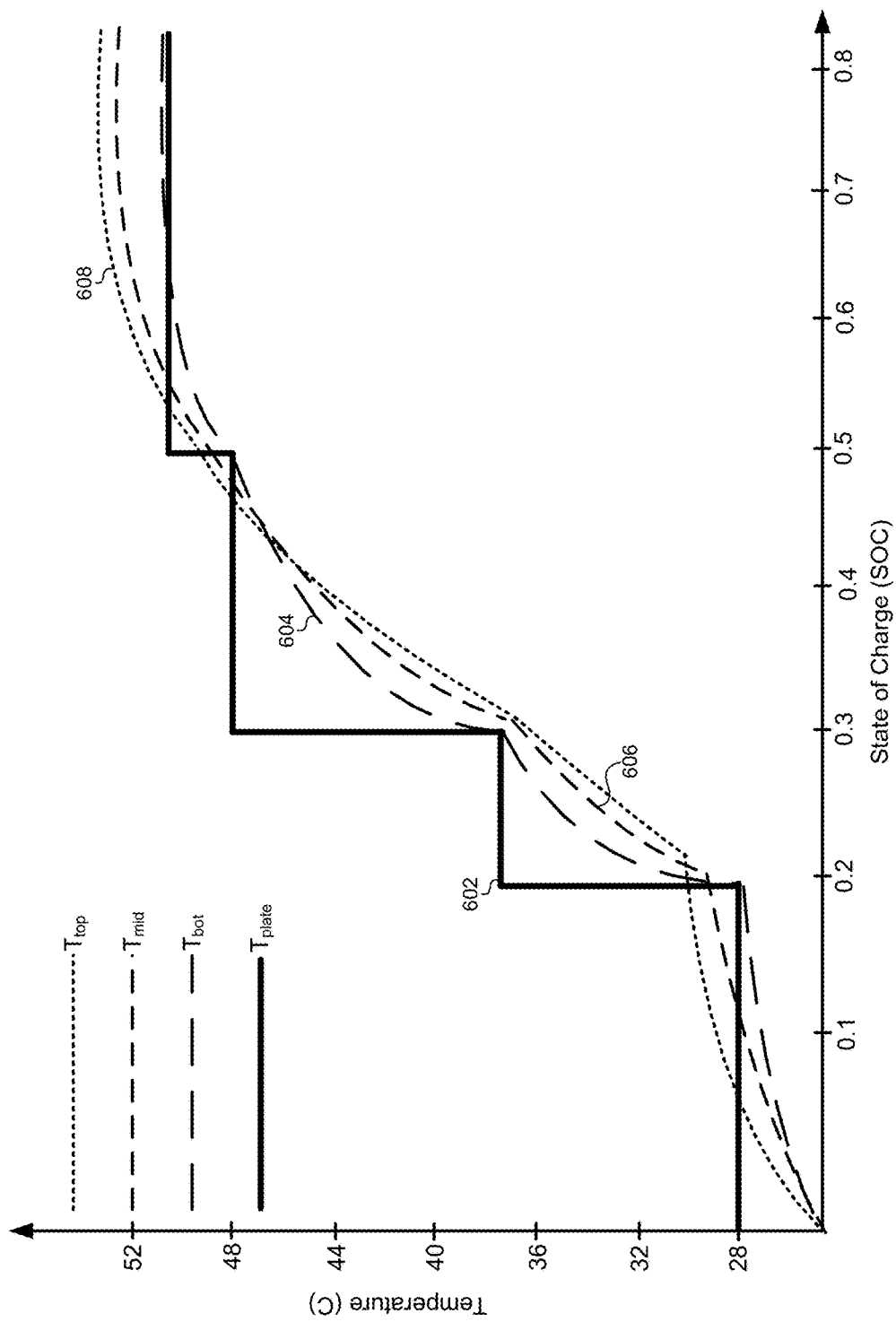
FIG. 6 illustrates an optimal input temperature profile and the corresponding temperature response simulated within the battery cell, according to some embodiments.

FIG. 6 illustrates an optimal input temperature profile and the corresponding temperature response simulated within the battery cell, according to some embodiments. As described above, the battery cell has been divided into three separate regions, the representations of which have been simulated individually. The model described above accepts two input parameters: (1) a value indicative of a rate of charge, such as an input current or SOC characteristic, and (2) an input temperature profile. As used herein, the term "temperature profile" may describe a sequence of temperature inputs for the TMS. The temperature profile may include target temperatures that should be measured by the TMS, or the temperature profile may be actual temperatures applied by the TMS to the plurality of battery cells. In this example, the temperature profile includes transitions between target temperatures that are based on an SOC percentage. For example, when the battery is 20% charged, the input temperature may change from 28° C. to 37° C. Similarly, when the battery is 30% charged, the input temperature may change from 37° C. to 48° C., and so forth as illustrated. In other embodiments, changes in the sequence of target temperatures may be governed by timing constraints or other inputs.

FIG. 6 also illustrates the simulated internal temperatures generated by the simulation. Curve 604 corresponds to the calculated temperature in the bottom portion of the battery cell, curve 606 corresponds to the calculated temperature in the middle portion of the battery cell, and curve 608 corresponds to the calculated temperature in the top portion of the battery cell. In a traditional TMS, a target temperature between 25° C. and 50° C. would simply be set by the TMS to warm the batteries up during a fast charge cycle. However, this would necessarily result in uneven heating of the battery, and would lead to non-uniform lithium plating inside the battery. By providing a stepped input temperature profile as illustrated in FIG. 6, the TMS can more uniformly heat the battery from top to bottom, which both minimizes the total lithium plating and causes any lithium plating that does occur to be uniform throughout the battery cell.

In some embodiments, a plurality of test input temperature profiles can be provided to the model under particular charging conditions. The charging conditions may be varied by starting temperature, charge rate, battery type, TMS type, and so forth, and may be represented as parameters in the modeling equations. After setting these conditions, a plurality of test input temperature profiles can be simulated, and the results can then be analyzed. In order to select an optimal input temperature profile, one criterion may include minimizing differences in the resulting simulated temperatures in each section of the battery cell. For example, the output calculated temperatures can be statistically analyzed to determine a variance or deviation that is indicative of how uniformly the temperatures changed during the simulation. The optimal input temperature profile can then be selected by selecting the input that generated the calculated temperatures with the least variance.

Figure 7:
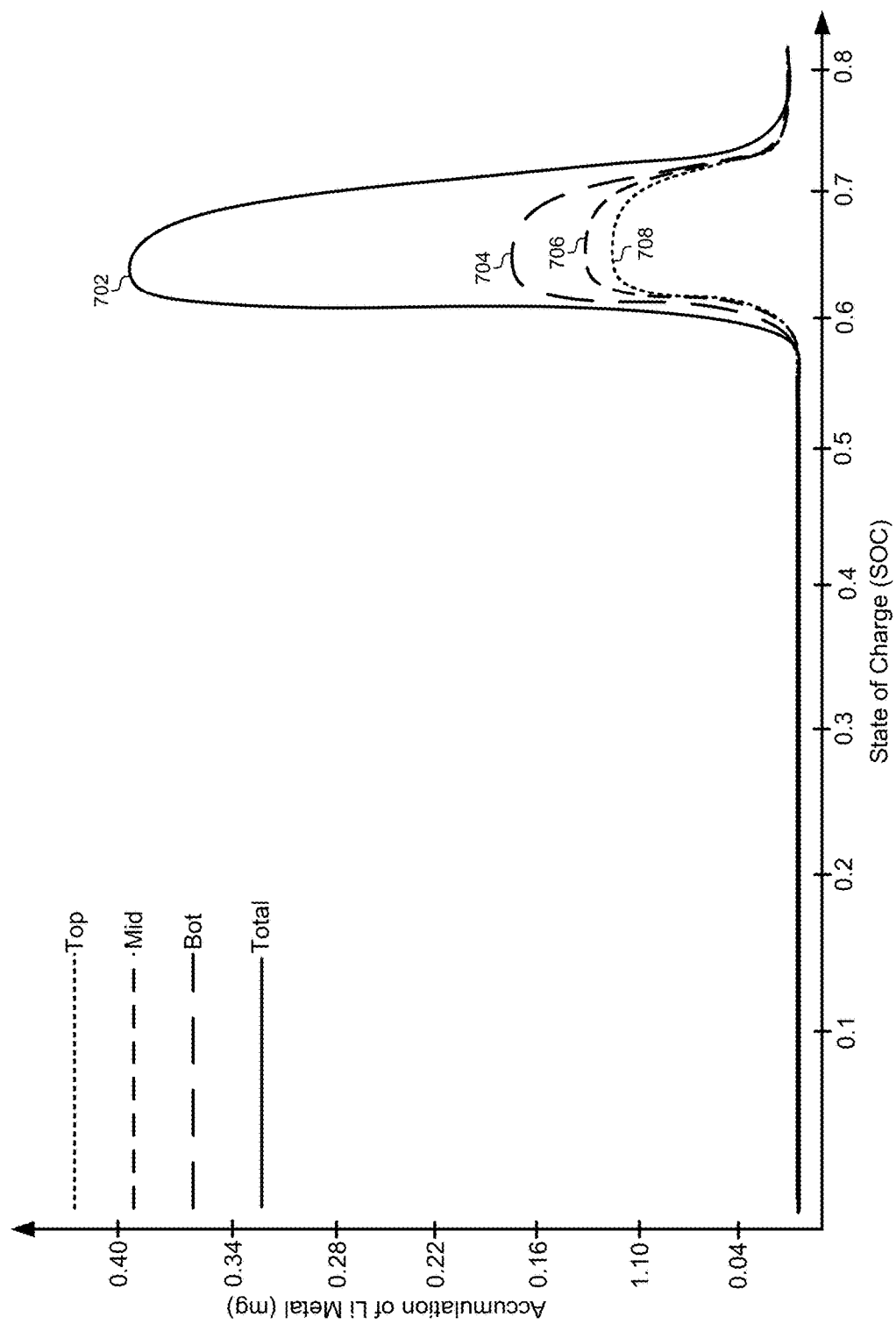
FIG. 7 illustrates a graph of the lithium plating that occurs during a single charge cycle using the optimal input temperature profile, according to some embodiments.

FIG. 7 illustrates a graph of the lithium plating that occurs during a single charge cycle using the optimal input temperature profile, according to some embodiments. Using a traditional TMS input without optimizing the temperature profile, it is not uncommon to see simulated lithium plating totaling above 60 mg. However, using the optimal input temperature profile, the total lithium 702 plating is less than 1 mg. Additionally, the lithium plating that occurs in each of the three sections of the battery cell is nearly uniform. In this example, the lithium in the top portion 708, the lithium in the middle portion 706, and the lithium in the bottom portion 704 are all within 0.10 mg of each other. This graph illustrates the dramatic improvement in lithium plating that can be attributed to determining an optimal input temperature profile based on the simulation method described above.

In addition to selecting an optimal input temperature profile based on uniformity in temperature changes throughout the battery cell, some embodiments may also select an optimal input temperature profile based on minimizing a total amount of lithium plating. Some embodiments may also select an optimal input temperature profile based on the uniformity of lithium plating throughout the battery cell. These metrics may be combined together in a single cost equation which can be minimized to select the optimal input temperature profile. In some embodiments, each of the elements in this cost equation can be weighted based on a desired priority for the battery cell. For example, minimizing temperature variations and/or lithium plating variations within the battery cell may be weighted less heavily than minimizing an overall amount of lithium plating that occurs during the charge cycle.

Figure 8:
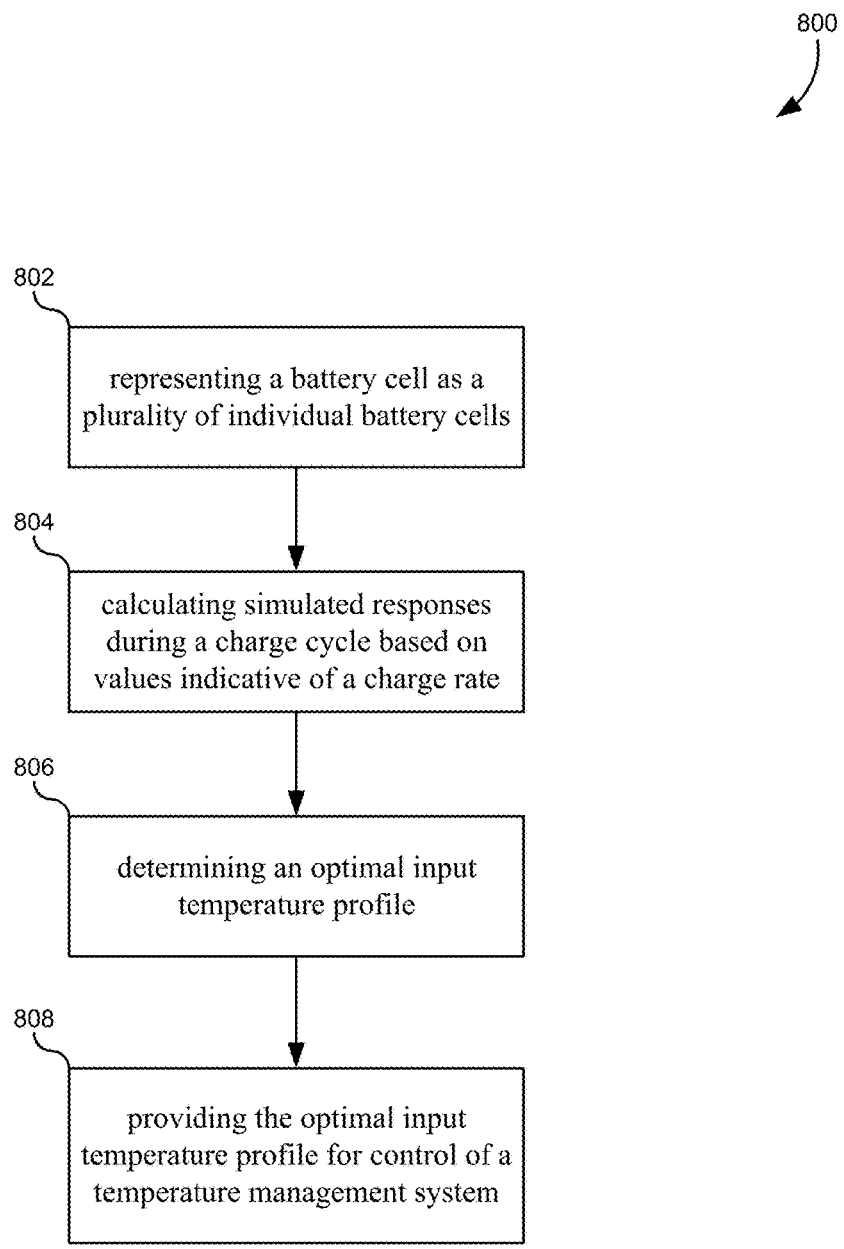
FIG. 8 illustrates a flowchart for a method of for controlling battery temperature during a charge cycle, according to some embodiments.

FIG. 8 illustrates a flowchart for a method of for controlling battery temperature during a charge cycle, according to some embodiments. The method may include representing a battery cell as a plurality of individual battery cells (802). Each representation of the individual battery cells may be configured to be simulated individually. In some embodiments, the battery cell may be divided into individual battery cells based on a distance/direction from a heating/cooling source, such as a cold plate or TMS tube. For example, for a heating/cooling source at the bottom of the battery cell, the battery cell can be subdivided into individual regions moving upwards in a direction away from the heating/cooling source. In another example, for a heating/cooling source on the side of the battery, the battery cell can be subdivided into vertical or radial slices that rotate or move away from the heating/cooling source. Generally, these subdivisions may be divided moving in a direction away from the heating/cooling source. Each of the plurality of individual battery cells may be modeled as an electrical network connected in series or parallel combinations, depending on how the battery cell was subdivided into individual battery cells.

The method may also include calculating one or more simulated responses for each of the individual battery cells (804). The simulation may take place during a simulated charge cycle, and inputs to the simulation may include parameters that define characteristics of the charge cycle. For example, the charge cycle may be a fast charge cycle for a battery pack in an electric vehicle. The simulation may accept a value that is indicative of a charge rate, such as a current value, current density value, a charging time, an SOC profile, an SOC increase rate, and/or the like. The simulation may also accept one or more input temperature profiles that are applied to at least one of the individual battery cells in the simulation. For example, the input temperature profiles may define different temperature sequences that are applied to a bottom region of the battery cell by a TMS. Each of the different input temperature profiles may generate a corresponding simulated response of various characteristics of the individual battery cells. The simulated response may include an amount of lithium plating, internal temperature changes, internal current densities, and so forth.

The method may additionally include determining an optimal input temperature profile (806). In some embodiments, the optimal input temperature profile may be determined by minimizing a cost equation using one or more factors. For example, one factor may include minimizing differences between simulated responses for each of the plurality of individual battery cells. This may include minimizing differences in temperature profile and/or lithium plating in the different regions of the battery cell. In some embodiments, this may include a factor that minimizes a total amount of lithium plating in the battery. The optimal temperature input profile may include a plurality of temperature changes that are applied based on SOC status, timing constraints, measured temperatures, and/or any other characteristic of the batteries.

The method may further include providing the optimal temperature input profile for control of a TMS (808). In some embodiments, the simulation and determination of the optimal input temperature profile may be performed outside of the electric vehicle using a simulation computer system. The optimal input temperature profile can then be downloaded to the processor of the TMS to control the temperature environment for the battery of the electric vehicle. Therefore, an optimal input temperature profile can be generated for a particular model of vehicle, TMS, and/or battery, and then downloaded to a plurality of electric vehicles.

Additionally, some embodiments may provide a plurality of optimal input temperature profiles to the TMS. Each of the optimal input temperature profiles may correspond to different environmental conditions that may occur while the electric vehicle is in use. For example, one optimal input temperature profile may be tailored to minimize lithium plating in hot weather environments. Another optimal input temperature profile may be more suitably adapted to cold weather situations. Some optimal input temperature profiles may be applied based on different SOC conditions or charge levels. Some optimal input temperature profiles may depend on the battery age, battery type, number of charge cycles, and/or any other characteristic of the battery. As described above, each set of input characteristics can generate a specific optimal input temperature profile from a set of tested input temperature profiles. Therefore, this system may provide optimal input temperature profiles for a number of different operational states or environmental characteristics. The TMS can then use the current operating state of the vehicle and/or battery to select the appropriate optimal input temperature profile to use. This selection process can be executed in real-time as the vehicle and TMS are in operation. For example, one optimal input temperature profile may be used for fast-charging situations in cold temperatures, while in other optimal input temperature profile may be used for slow-charging situations in warm temperatures.

In some embodiments, the TMS may include simulation software that performs these simulations. Alternatively, the TMS may be in communication with a computer server over a network that can upload data collected by the TMS and perform simulations remotely. Therefore, either the TMS itself or a remote computing system can perform simulations and identify optimal input temperature profiles. In some embodiments, the TMS can measure the actual responses of the battery and determine whether the optimal input temperature profile is producing the desired results. For example, temperature sensors may be placed at the bottom and/or top of the battery, and these temperature readings can be compared to the simulated temperature readings that are expected based on the optimal input temperature profile from the simulation. If deviations occur, the TMS and/or remote computer system can adjust the input temperature profile and/or the characteristics of the model based on the particular operating conditions and/or hardware in use. The simulations can be re-executed, and a new optimal input temperature profile can be generated or determined. This allows the TMS to adjust the optimal input temperature profile in real time as operating conditions and characteristics of the associated hardware change.

It should be appreciated that the specific steps illustrated in FIG. 8 provide particular methods of controlling battery temperature during a charge cycle according to various embodiments. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 9:
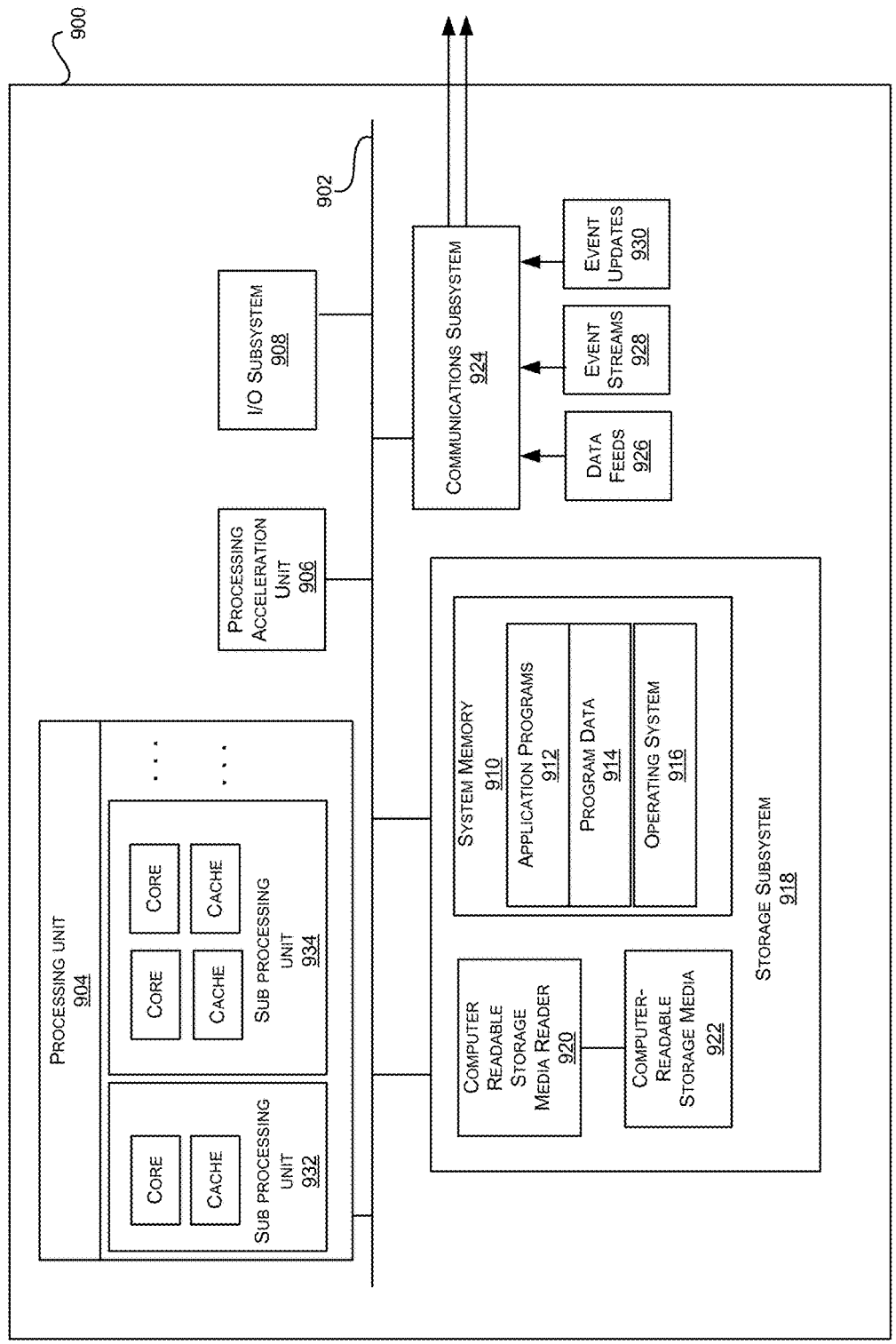
FIG. 9 illustrates an exemplary computer system, in which various embodiments may be implemented.

Each of the methods described herein may be implemented by a computer system that is part of the TMS and/or part of a remote server or dedicated simulation system. FIG. 9 illustrates an exemplary computer system 900 that has been specifically especially designed to implement the embodiments described herein. Specifically, these hardware and software modules depicted in FIG. 9 may be part of the TMS, part of a simulation system, and/or part of a remote server. Thus, the system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present invention.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A method for controlling battery temperature during a charge cycle, the method comprising:
representing a battery cell as a plurality of individual battery cells such that each representation of the individual battery cells can be simulated individually;
for each of the individual battery cells, calculating one or more simulated responses during a charge cycle based at least in part on one or more values indicative of a charge rate;
determining an optimal input temperature profile for the charge rate that minimizes an amount of lithium plating that occurs during the charge cycle; and
providing the optimal input temperature profile for control of a temperature management system that monitors and controls a temperature of the battery cell.

2. The method of claim 1, wherein the battery cell comprises one of a plurality of lithium-ion battery cells in a battery pack of an electric vehicle.

3. The method of claim 1, wherein the plurality of individual battery cells comprises at least three individual battery cells.

4. The method of claim 1, wherein the battery cell is divided into individual battery cells in a direction moving away from a heat/cold source.

5. The method of claim 1, wherein the battery cell is divided into individual battery cells from a bottom to a top of the battery cell.

6. The method of claim 5, wherein a heat source is disposed adjacent to the bottom of the battery cell.

7. The method of claim 1, wherein the one or more simulated responses comprises a calculation of an amount of lithium plating that is deposited during the charge cycle.

8. The method of claim 1, wherein the one or more simulated responses comprises current densities in the plurality of individual battery cells during the charge cycle.

9. The method of claim 1, wherein the one or more simulated responses comprises temperature changes in the plurality of individual battery cells during the charge cycle.

10. The method of claim 1, wherein calculating the one or more simulated responses comprises using a model based on mass conservation in the battery cell.

11. A non-transitory computer-readable medium comprising instructions that, when executed by one or more processors, cause the one or more processors to perform operations comprising:
representing a battery cell as a plurality of individual battery cells such that each representation of the individual battery cells can be simulated individually;
for each of the individual battery cells, calculating one or more simulated responses during a charge cycle based at least in part on one or more values indicative of a charge rate;
determining an optimal input temperature profile for the charge rate that minimizes differences between simulated responses for each of the plurality of individual battery cells; and
providing the optimal input temperature profile for control of a temperature management system that monitors and controls a temperature of the battery cell.

12. The non-transitory computer-readable medium of claim 11, wherein calculating the one or more simulated responses comprises using a model based on charge conservation in the battery cell.

13. The non-transitory computer-readable medium of claim 11, wherein the one or more values indicative of a charge rate comprises an input current.

14. The non-transitory computer-readable medium of claim 11, wherein calculating the one or more simulated responses during the charge cycle is further based at least in part on an input temperature profile.

15. The non-transitory computer-readable medium of claim 11, wherein the operations further comprise providing a plurality of input temperature profiles when calculating the one or more simulated responses.

16. The non-transitory computer-readable medium of claim 15, wherein the optimal input temperature profile is selected from the plurality of input temperature profiles.

17. The non-transitory computer-readable medium of claim 11, wherein the optimal input temperature profile is further determined by minimizing an amount of lithium plating that occurs during the charge cycle.

18. The non-transitory computer-readable medium of claim 11, wherein the optimal input temperature profile is determined by identifying an input temperature profile that keeps a temperature of the battery cell below a maximum threshold.

19. The non-transitory computer-readable medium of claim 11, wherein the temperature management system controls a heat source placed adjacent to the battery cell.

20. The non-transitory computer-readable medium of claim 11, wherein the operations further comprise controlling the temperature of the battery cell.

* * * * *